United States Patent [19]

Peddinghaus et al.

[11] 3,797,955
[45] Mar. 19, 1974

[54] BORING AND PUNCHING DEVICE

[75] Inventors: Werner Peddinghaus, Bruchhausen 21, Sprockhovel-Hasslinghausen; Ludwig Regnebrecht, Gevelsberg, both of Germany

[73] Assignee: said Peddinghaus, by said Regnebrecht

[22] Filed: Nov. 10, 1972

[21] Appl. No.: 305,545

[30] Foreign Application Priority Data
Nov. 12, 1971 Germany............................ 2156226

[52] U.S. Cl...................... 408/20, 408/99, 408/130
[51] Int. Cl............................................. B23b 47/22
[58] Field of Search........................ 408/20, 130, 99

[56] References Cited
UNITED STATES PATENTS
3,164,040  1/1965  Reynolds............................ 408/130

Primary Examiner—Gil Weidenfeld
Attorney, Agent, or Firm—Walter Becker

[57] ABSTRACT

A boring and punching device in which a double acting fluid pressure operable piston is reciprocally mounted in a cylinder and divides the cylinder into two cylinder sections one of which is adapted per time unit to be acted upon by two different quantities of pressure fluid for boring and punching respectively. The device furthermore includes a connecting rod connected to the piston and having an axial passage therethrough through which extends a rotatable spindle. A tool holder is detachably and exchangeably connected to the lower end of the connecting rod and is adapted selectively to receive a punching tool or a boring tool which latter is adapted to be rotatably connected to the spindle.

9 Claims, 2 Drawing Figures

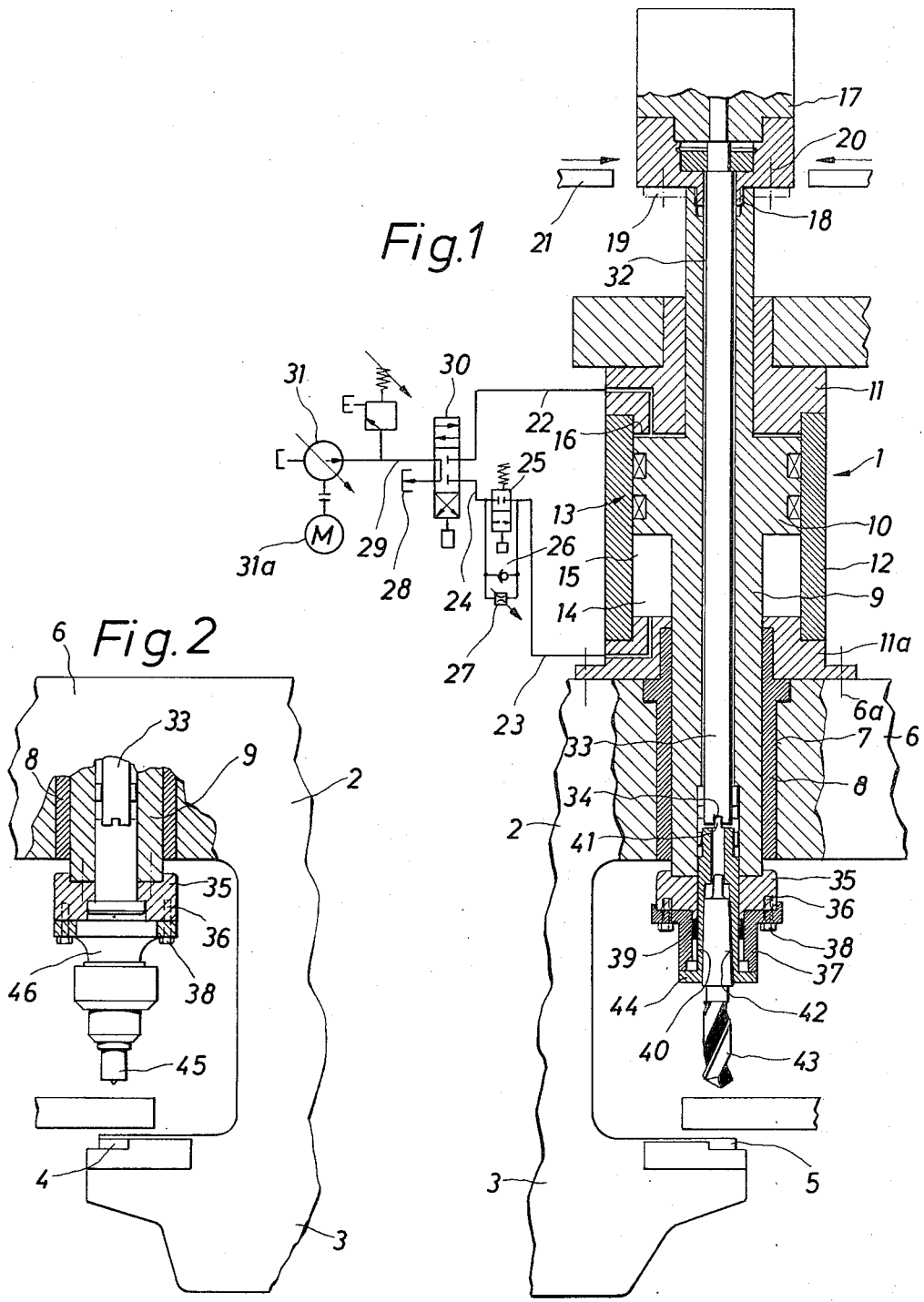

BORING AND PUNCHING DEVICE

The present invention relates to a boring device with a voring spindle and a feed sleeve which receives the boring spindle and is adjustable together with the boring spindle in longitudinal direction by means of a feeding device and absorbs the boring pressure either entirely or partly.

Boring devices of this type are known in connection with vertical boring machines and also in connection with horizontal boring and milling machines. With machines of this type, the boring spindle conveys the turning moment onto the tool while the feed sleeve, on the one hand, assures the static strength of the boring spindle during the boring operation which means prevents a buckling of the boring spindle and, on the other hand, brings about the feed of the boring spindle. The boring pressure as well as the feeding or advancing speed are absorbed by the feed sleeve or are determined by the feed. The feed is generally effected by mechanical drive means, such as worms and/or back gears.

It is an object of the present invention to provide a boring device of the above described character which will broaden the field of application of such boring devices.

It is another object of this invention to provide a boring device as set forth in the preceding paragraph, which will be simple in construction and relatively inexpensive and will also make it possible to quickly adapt the device to the broadened field of application.

These and other objects and advantages of the invention will appear more clearly from the following specification in connection with the accompanying drawing, in which:

FIG. 1 is an axial section and partly a side view of the device according to the invention with a boring tool.

FIG. 2 shows the lower end of the device according to the invention with a punching tool.

The device according to the present invention is characterized primarily in that the feed sleeve is formed by the connecting rod of a pressure fluid operable double-acting piston in a cylinder of which one chamber is adapted to be subjected to two different quantities of pressure fluid per time unit for either drilling or punching, and is furthermore characterized in that the front end of the feed sleeve is equipped with means for selectively connecting to the front end a boring or a punching tool.

The cylinder chamber of the pressure fluid operable piston is in contrast to heretofore known boring devices acted upon per time unit, on the one hand, by such a quantity of pressure fluid which causes the feed sleeve to carry out a shock-like movement for the punching operation and, on the other hand, is adapted to receive a smaller quantity of pressure fluid corresponding to the boring feed, while during the punching operation as well as during the boring operation the necessary axial pressure is exerted upon the feed sleeve. Thus, the feed sleeve will during the punching operation exert the function of a punch carriage of a punching device.

The invention is furthermore distinguished over heretofore known boring devices by the fact that two cylinder sections are provided which are adapted to be fully subjected to pressure fluid so that the feed sleeve can after completed punching and boring operations be subjected to the necessary return force.

According to a practical design of the device according to the invention, one of the pressure fluid receiving chambers is connected to a quantity-control valve.

According to a further development of the invention, the boring spindle is non-rotatably but detachably connected to a tool sleeve arranged in the feed sleeve or an extension thereof. This tool sleeve rests directly or indirectly against the feed sleeve in longitudinal direction. A further feature serving the same purpose, namely to permit a fast exchange of the differnet tools, i. e., the boring tool and the punching tool, consists in that the tool sleeve is rotatably and longitudinally non-displaceably held in a bushing which is adapted to be coupled to the feed sleeve or an extension thereof. As a result thereof, the tool sleeve together with the boring tool and the bushing is as a unit detachable from the feed sleeve and can be exchanged for a corresponding tool sleeve for receiving a punching tool with folding device for the punching tool.

The boring spindle motor is connected to the feed sleeve by an easily detachable connection and is adapted to be held stationary in its position, especially at its respective height, during the punching operation. In this connection means are provided to permit an easy displacement of the boring spindle in its longitudinal direction within the feed sleeve. This makes it possible during the punching operation to detach the motor from the feed sleeve so that the mass of the drive motor will not affect the shock-like punching operation.

Referring now to the drawing in detail, the device 1 according to the invention is arranged on a yoke 2 having a substantially C-shaped cross section. The yoke 2 is preferably vertically freely movable on a non-illustrated guiding device or suspension. In the lower flange 3 of yoke 2 there is arranged a counter tool 4 in the form of a matrix, or there is arranged a counter bearing 5 for the boring tool. As far as the forces are concerned, the yoke forms a unit which absorbs the pressure as well as the counter pressure during the boring and punching operations. The yoke 2 has a flange 6 provided with a bore 7 with a bushing 8 the inner wall of which serves as sliding guide for a connecting rod 9 which latter has connected thereto a piston 10 which may be provided with corresponding seals 10a. The piston moves in a cylinder generally designated 13 which is formed by the parts 11, 11a and 12 and which is connected to flange 6 in any convenient manner, for instance, by screw bolts 6a. The cylinder 13 furthermore comprises a cylinder chamber 14 which latter in the respective position of piston 10 is divided into a lower section 15 and an upper section 16.

The piston rod 9 extends through part 11 of cylinder 13 where a corresponding seal may be provided. The free end of the piston rod 9 carries a drive motor 17 by means of an easily detachable connection; for instance, the drive motor 17 may be connected to the connecting rod 9 by means of a threaded extension 18. The connecting rod may also be provided with a flange 19 which can be connected to the motor by screw connections 20. Laterally adjacent the motor 17 or the upper end of the connecting rod 9. supports 21 adjustable in the direction of the arrows A, B may be provided. The arrangement and purpose of these supports will be described further below.

One conduit 22, 23 each respectively leads into the two sections 15, 16 of the cylinder chamber 14 while between the conduit 23 and a further conduit 24 there are provided a two-way valve 25, a check valve 26 and a quantity-control valve 27. Between the conduits 22, 24, on the one hand, and a pressure fluid storage container 28 and a conduit 29, on the other hand, there is arranged a four-way valve 30.

The pressureless fluid medium is conveyed into the pressure fluid storage container 28, whereas the second conduit 29 communicates with a pump 31 adapted to be driven by a motor 31a.

Connecting rod or piston rod 9 has a central bore 32 for receiving a boring spindle 33 which is adapted to be rotated by motor 17 and at its lower end face is provided with a transverse groove 34.

Firmly screwed onto the lower end of the connecting rod 9, which forms the feed sleeve for the boring spindle 33, is an intermediate member 35 which carries a number of circularly arranged screws 36. A bushing 37 rests against the intermediate member 35. This bushing 37 has semicircular longitudinal slots with widened portions in conformity with the arrangement of the screws 36 which latter can pass with their heads 38 through the widened portions. In this way a bayonet-like fast acting coupling will be established between the bushing 37 and the intermediate member 35.

By means of a combined bearing 39 the bushing 37 holds the tool sleeve 40 in its postion. Sleeve 40 has its upper end provided with a strip-like extension 41 which extends into the groove 34 so that the tool sleeve 40 is so to speak through a jaw clutch non-rotatably but longitudinally displaceably connected to the boring spindle 33. The tool sleeve 40 furthermore has a conical recess 42 for receiving the steep angled taper of the boring tool 43 and has an annular flange 44 by means of which the tool sleeve 40 can rest against the bushing 37. In this way the tool sleeve 40 absorbs the boring pressure and conveys the same through bushing 37 and intermediate member 35 to the connecting rod 9.

For purposes of punching, the bushing 37 is uncoupled from the intermediate member 35 so that the tool sleeve 40 together with the bushing and tool 43 can be removed from the connecting rod 9 and the boring spindle 33. Instead of the boring tool 43 there will then be coupled to the intermediate member 35 a punching tool 45. This is effected through the intervention of a connecting member 46 which likewise has its recesses so arranged as to be able to receive the screws and to permit the passage of the screw heads 36, 38 as does the bushing 37. The punching tool 45 will then have no connection with the spindle 33 and merely rests against the intermediate member 35 which is connected to the feed sleeve 9 which latter, during the punching operation, performs the work of a punch carriage.

The operation of the device is as follows: For purposes of punching, the upper cylinder chamber section 16 is supplied with pressure fluid through the conduit 22, whereas the section 15 is emptied. To this end the two-way valve 25 is connected to the pressure fluid storage container 28 inasmuch as the four-way valve 30 occupies its lowermost postion so that the pump 31 communicates with conduit 22 and, as previously stated, conduit 23 communicates with the container 28.

For withdrawing the punching tool from the workpiece, to which effect a force is necessary which aproximates the punching force, the two-way valve 25 remains in the indicated upper position, whereas the four-way valve 30 is moved into its upper position so that the conduits 22 and 23 cross each other. Conduit 22 will then be connected to the container 20, and conduit 23 will be in communication with pump 31.

When a boring operation is desired, the pump 31 is connected to conduit 22 by moving the four-way valve 30 to its lowermost position while the two-way valve 25 is moved to its lower position shown in FIG. 1 so that the conduit 23 communicates with the quantity-control valve 27. In conformity with the adjustment of this valve, a smaller quantity of pressure fluid passes from the section 14 to the container 28 than was the case during the punching operation. To pull the boring tool out of the workpiece, the four-way valve 30 is moved to its uppermost position so that the conduit 22 communicates with the container 28, and the conduit 23 communicates with the pump 31.

The return of the connecting rod 9 to its starting position may also be effected by means of the check valve.

To avoid the necessity, during the punching operation, to couple the motor 17 to the connecting rod 9 serving as feed sleeve, motor 17 may be disconnected from the connecting rod 9 and may be placed upon the parts 21 so that for the punching operation only the connecting rod 9 carries out a movement. To this end, the boring spindle 33 is correspondingly displaceably arranged in the connecting rod 9.

Instead of this feature, the boring spindle motor 17 may also be designed as a light hydraulic motor which is always connected to the feed sleeve and the mass of which is small with regard to the punching movement.

Preferably, yoke 2 may be freely movable on a vertical guide or suspension so that the workpiece 43 or 45 may always remain in its position of height, whereas during the downward movement of the boring tool 43 or during the first slow downwsrd movement of the punching tool 45 yoke 2 is adjusted as to height in such a way that the flange 3 with its matrix 4 or the counter bearing 5 will rest from below against the workpiece 43, 45.

It is, of course, to be understood that the present invention is, by no means, limited to the specific showing in the drawing but also comprises any modifications within the scope of the apended claims.

What we claim is:

1. A boring and punching device, which includes: a cylinder, a double acting piston reciprocable in said cylinder and dividing the interior of said cylinder into first and second cylinder chamber means varying in size in conformity with the movement of said piston, a connecting rod having an axial passage therethrough and being connected to and reciprocable with said piston, a rotatable spindle rotatably arranged within said axial passage, tool holding means detachably connectable to that end portion of said connecting rod which is remote from said piston for selectively connecting thereto a boring tool or a punching tool, one end of said spindle being adjacent said tool holding means and being provided with means for driving engagement with a boring tool in said tool holding means, conduit means connectable to a fluid source and respectively leading to said first and second cylinder chamber means, and control valve means interposed in said conduit means and operable to control the supply of pressure fluid through said conduit means to one of said cylinder means so as to furnish per time unit selectively a greater and a smaller quantity of fluid under pressure to said one cylinder chamber means for boring and punching respectively.

2. A device according to claim 1, in which said control valve means includes a quantity control valve.

3. A device according to claim 1, which includes C-shaped yoke means having an upper flange supporting said cylinder and having a lower flange forming a boring and punching table.

4. A device according to claim 3, in which said lower flange has recess means for selectively receiving a matrix for cooperation with a punching tool or a counter bearing for cooperation with a drilling tool.

5. A device according to claim 1, in which said tool holding means includes a tool sleeve rotatably connectable to that end portion of said spindle which is remote from said piston for receiving and holding a boring tool.

6. A device according to claim 5, which includes bushing means supported by said connecting rod and rotatably supporting said tool sleeve.

7. A device according to claim 6, in which said tool sleeve together with said bushing and a boring tool in said tool sleeve forms a unit adapted as a unit to be operatively connected to and disconnected from said connecting rod.

8. A device according to claim 5, in which said tool holding means includes a holder for receiving a punching tool.

9. A device according to claim 1, which includes motor means having its shaft in substantially axial alignment with said spindle, and connecting means detachably drivingly connecting said motor means to said spindle.

* * * * *